United States Patent
Cabon

(10) Patent No.: US 11,140,863 B2
(45) Date of Patent: Oct. 12, 2021

(54) DIPPING DEVICE FOR MECHANICAL MILKING SYSTEM

(71) Applicant: BOUMATIC LLC, Madison, WI (US)

(72) Inventor: Alain Cabon, Bodilis (FR)

(73) Assignee: BOUMATIC LLC, Madison, WI (US)

( * ) Notice: Subject to any disclaimer, the term of this patent is extended or adjusted under 35 U.S.C. 154(b) by 567 days.

(21) Appl. No.: 16/155,033

(22) Filed: Oct. 9, 2018

(65) Prior Publication Data

US 2019/0174707 A1 Jun. 13, 2019

(51) Int. Cl.
*A01J 7/04* (2006.01)
*A01J 5/04* (2006.01)
*A01J 5/02* (2006.01)

(52) U.S. Cl.
CPC . *A01J 7/04* (2013.01); *A01J 5/02* (2013.01); *A01J 5/041* (2013.01)

(58) Field of Classification Search
CPC .................. A01J 7/04; A01J 5/041; A01J 5/02
See application file for complete search history.

(56) References Cited

U.S. PATENT DOCUMENTS 9,854,781 B2 * 1/2018 Dole .......................... A01J 7/04

FOREIGN PATENT DOCUMENTS

EP 0801893 A2 10/1997

OTHER PUBLICATIONS

Canadian Intellectual Property Office, Canadian Office Action, Application No. 3,021,948, dated Apr. 17, 2019, 3 pages.
Search Report and Written Opinion received from the Intellectual Property Office in France, Application No. FR1852494, dated Sep. 25, 2018, 6 pages.
Preliminary Search Report and Written Opinion received from the Intellectual Property Office in France, Application No. FR1761878, dated Jun. 20, 2018, 6 pages.
European Patent Office, Extended European Search Report, Application No. 18198911.2, dated Mar. 26, 2019, 7 pages.

* cited by examiner

*Primary Examiner* — Monica L Barlow
(74) *Attorney, Agent, or Firm* — Andrus Intellectual Property Law, LLP

(57) ABSTRACT

A dipping device for a mechanical milking system comprises at least one liner defining an accommodation space for a teat. The liner has a milk evacuation opening and a collecting claw. For each liner, a connector connects the liner to the collecting claw. The dipping device further includes a source of a dipping product, an injunction interface mounted on the collecting claw, and an injection tube for each liner. The injection tube extends from the interface and substantially to the teat accommodation space, running inside of the connector and through the evacuation opening.

10 Claims, 2 Drawing Sheets

DIPPING DEVICE FOR MECHANICAL MILKING SYSTEM

TECHNICAL FIELD

The field of the invention is the field of design and manufacturing of equipment for mechanical milking of dairy animals.

More precisely, the invention relates to a device for dipping the teats of a dairy animal, within a mechanical milking system, in order to facilitate the physical integrity of the cow, particularly of her teats, and to eliminate germ-type contaminations.

BACKGROUND

A dairy animal has an udder from which the teats extend, the compression of which enables one to extract the milk secreted by the mammary glands.

In the field of the invention, the mechanical milking systems have been used for a long time and conventionally include:
- a collecting claw;
- liners;
- for each liner, a connector connecting the liner to the collecting claw.

Each liner defines a space for accommodating a teat of the dairy animal. The liner includes a component for massaging the teat, which is capable of causing milk to come out, and has a milk evacuation opening.

During the milking, the liners of the milking system are positioned on the teats. Each teat is thus inserted in the accommodation space of a liner.

The massaging component, in combination with a suction device, enables one to collect the milk secreted by the mammary glands, this milk being subsequently collected by the collecting claw after having been evacuated through the milk evacuation outlets of the liners and then through the connectors.

It is known that a milking operation can lead to health problems for the dairy animal.

Indeed, in a cow, the milking phase results in an alternation of suction and then massaging of the teats in order to collect the milk present in the udder. This operation leads to a relaxation of the sphincters and an opening of the meatus of the teats through which the milk is extracted.

After milking, these meatus take several minutes to close.

In order to guarantee the physical integrity of the cow and to eliminate contaminations, for example, due to germs, it is necessary to apply a dipping product which is hydrating and disinfectant, and which makes it possible to ensure the protection of the teats until closing of the meatus.

SUMMARY

This application can be manual or automated using a teat dipping device integrated in a mechanical milking system.

Such a dipping device is described in the patent document published under the number US 2005/0045108 A1.

According to the solution described by this document, the liner of the milking system is designed to integrate, at the head thereof, a portion of the dipping device in such a way that the dipping with a dipping product can be performed during the withdrawal of the liner.

After the milking phase, the liner is withdrawn from the teat, and that is when the dipping product is sprayed at the head of the liner. Thus, the dipping product is applied over the whole portion of the teat that passes by at the head of the liner.

This dipping device has the disadvantage of requiring the use of liners specifically designed to be compatible. Consequently, when equipping a pre-existing mechanical milking system with the dipping device, it is necessary to change the liners.

This dipping device also has the disadvantage of not performing an efficient application of the dipping product and of consuming a large quantity of this product.

Indeed, the product is applied in a global manner onto the teat during its extraction from the liner.

Other dipping devices are described in the patent documents published under the numbers DE 101 60 161 A1 and DE 10 2004 044 916 A1.

The known dipping devices described in these documents include liners designed so that, at a lower end, they have a nozzle for spraying of dipping product. This spray nozzle is presented through a pipe that is independent from the milk evacuation outlet of the liner. This pipe leads to the outside of the liner so that it can be connected to an intake of dipping product.

These dipping devices make it possible to perform the dipping through the interior of the liner, when the teat is still in place in the accommodation space of the liner. In this manner, the dipping is more localized than in comparison with the dipping device in which the dipping is performed during the extraction of the teat, at the head of the liner, which reduces the quantity of dipping solution consumed.

However, these dipping devices have the disadvantage of requiring the replacement of the liners of a mechanical milking system that was not originally designed to be equipped with this device.

An aim of the invention is in particular to remedy the disadvantages of the prior art.

More precisely, an aim of the invention is to propose a mechanical milking system equipped with a dipping device that can be used with any known commercial liner or collecting claw.

An aim of the invention is also to propose such a dipping device that is easily and quickly mounted in the mechanical milking system.

Another aim of the invention is to propose such a mechanical milking system that improves the dipping of a teat, and particularly in comparison with what is enabled by the milking systems and dipping devices of the prior art.

These aims and others appearing below are achieved by means of a mechanical milking system which includes:
- at least one liner defining an accommodation space for a teat and having a milk evacuation opening;
- a collecting claw;
- for each liner, a connector connecting the liner to the collecting claw;
- a device for dipping the teat with a dipping product, the dipping device including a source of dipping product and an injection interface mounted on the collecting claw, the interface including at least one pipe with:
  - at least one inlet located on an external surface of the interface and intended for being coupled to the source of dipping product;
  - at least one outlet located inside of a milk circulation space;
- an injection tube for each liner, the injection tube extending from said at least one outlet of the pipe and substantially to the teat accommodation space, running inside of the connector and through the evacuation opening.

Thanks to the design of the milking system according to the invention, the mounting of the dipping device is easily performed, while not requiring any modification of the liners or of the collecting claw.

Indeed, the installation of the dipping device on the system can be performed by disassembling just the collecting claw (opening of the collecting claw, removal of one or more tubes extending from the claw, . . . ), inserting the injection tubes in the connectors and coupling the interface to the collecting claw.

The injection tubes have an outer diameter enabling them to be inserted in the openings and the connectors through which the milk is evacuated, while not disturbing the evacuation of the milk.

These injection tubes, placed inside of the evacuation circuit (accommodation space for the teats where the milk extracted from the teats is received), make it possible to optimize the dipping of the teats.

Indeed, the dipping device of the system makes it possible to route the dipping product directly into the accommodation space, when the teat is still inserted in this accommodation space. The dipping product is thus injected substantially in the direction of the meatus of the teat after the milking, thus optimizing the action of the dipping product. Furthermore, thanks to the vacuum created inside of the liner during massaging of the teat, the dipping solution applied on the meatus is in an emulsified form.

It should be noted that, in the context of the invention, the expression "substantially to the accommodation space of the liner" is, for example, understood to mean that the end of the injection tube directed towards the accommodation space of the liner is at a distance of 2 to 80 millimeters from said space.

According to a preferred embodiment, the collecting claw includes a bowl having an upper portion and a lower portion that can be assembled together, and the interface is inserted between the upper portion and the lower portion of the bowl.

According to this design, the interface is advantageously installed on a component of the collecting claw which is easy to access. This bowl also allows easy access to the start of the connectors from the collecting claws to the liners; the mounting of the dipping device on the mechanical milking system is thus simplified as a result.

Advantageously, the interface assumes the form of a ring and has a central opening that opens on both sides of the interface, the central opening forming the milk circulation space.

Such an interface is simple and economical to design and manufacture, while being easy to install on the milking system.

According to a preferred feature, the injection tube is flexible.

The insertion of the injection tubes in the connectors and then in the accommodation space of the liners is simplified as a result.

According to a preferred solution, said at least one liner includes a massaging component for the teat, and the injection tube has a first end leading into the accommodation space while being surrounded by a cylindrical portion of the massaging component, the injection tube being designed to lead into the accommodation space substantially at a maximum depth of insertion of the teat in the accommodation space.

According to this design, the dipping of the teats is optimized even more.

Indeed, the operation of the massaging component automatically leads to a centering of the end of the injection tube in the accommodation space. Also, given that the injection tube is designed to open substantially at the maximum depth of insertion of the teat in the accommodation space, the injection of the dipping product is then directed as close as possible to the meatus of the teat.

This optimization of the injection of the dipping product makes it possible to ensure satisfactory application of the dipping product while avoiding excessive consumption of this product.

According to an advantageous solution, the mechanical milking system includes a compressed air injection device communicating with the dipping device.

Thanks to the compressed air injection device, it is possible to dry the dipping product injection circuit.

Preferably, the mechanical milking system includes means for synchronization of the dipping device with the massaging component.

A synchronization of the massaging component makes it possible to apply the dipping product in the form of an emulsion or foam, thanks to the association of an injection of the dipping product in liquid form with the creation of a vacuum resulting from the action of the massaging component.

Such an emulsion or foam further optimizes the application of the dipping product onto the teat, while reducing the quantity of dipping product used.

According to a preferred embodiment, the dipping device is connected to a source of disinfectant.

The source of disinfectant makes it possible to supply the interface with the disinfectant thanks to a disinfectant supply circuit.

The disinfectant supply circuit can be separate from a dipping product injection circuit from the source of the dipping product to the interface, or can be at least partially the same as this dipping product injection circuit.

After the dipping of the teats and the extraction of the teats from the liners, the use of the interface for injection of a disinfectant makes it possible to optimize the disinfection of the liners while enabling the disinfection of the pipe of the interface and the injection tubes.

Advantageously, the mechanical milking system includes a rinsing device coupled to the collecting claw.

The invention also relates to a device for dipping a teat with a dipping product, for a mechanical milking system which includes:
at least one liner defining an accommodation space for a teat and having a milk evacuation opening;
a collecting claw;
for each liner, a connector connecting the liner to the collecting claw;
the dipping device also including an injection interface including:
means for assembling on the collecting claw;
at least one pipe with:
at least one inlet located on an external surface of the interface and intended for being coupled to a source of dipping product;
at least one outlet located inside of a milk circulation space;
an injection tube for each liner, the injection tube extending from said at least one outlet of the pipe and having a length arranged, or in other words adjusted, so that said injection tube extends substantially to the accommodation space of the liner, running inside of the connector and through the milk evacuation opening of the liner when said injection tube is partially housed in a connector connecting a liner to the collecting claw, and a liner.

Thanks to the design of the dipping device, it can be offered and delivered in the form of a kit to be installed on a pre-existing mechanical milking system not specially designed for being provided with a dipping device.

BRIEF DESCRIPTION OF THE DRAWINGS

Other features and advantages of the invention will appear clearly upon reading of the following description of preferred embodiments of the invention given as illustrative and non-limiting examples and of the appended drawings in which.

DETAILED DESCRIPTION

Figure 1:
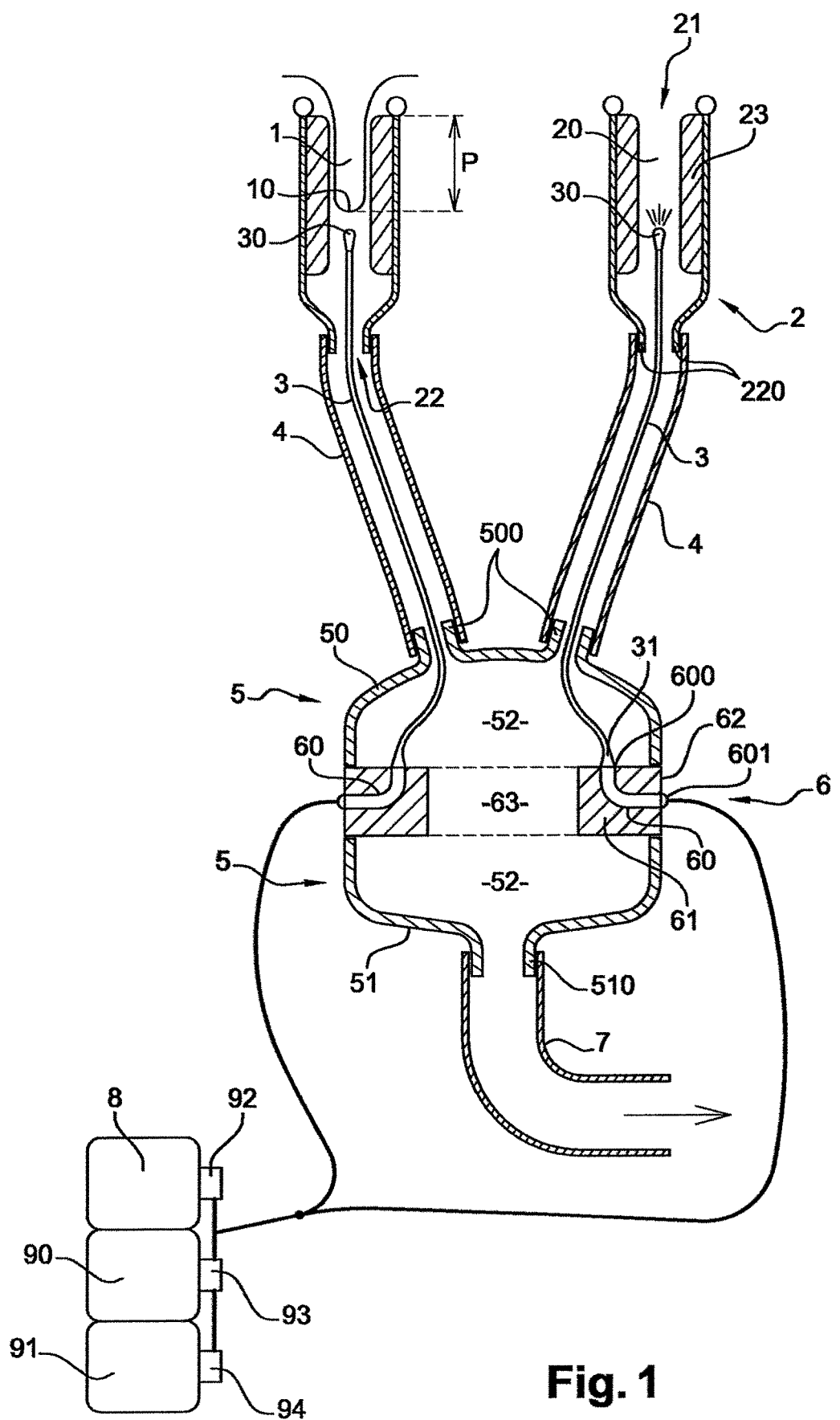
FIG. 1 is a diagrammatic representation in cross section illustrating an embodiment example of a milking system according to the invention.

In reference to FIG. 1, a mechanical milking system according to the invention includes:
 four liners 2;
 a collecting claw 5;
 connectors 4 connecting the liners 2 to the collecting claw 5.

The upper interior portion of each liner defines an accommodation space 20 for a teat 1.

In the context of the invention, the accommodation space designates a volume located inside of the liner. This accommodation space is designed to receive teats of any size and can in particular be defined by a maximum depth P of insertion of a teat in the liner.

The liners have an insertion opening 21 for a teat and an evacuation opening 22 for the milk, delimited by a rim 220.

The liners 2 also include a massaging component 23 for the teats 1. Such a massaging component is known in itself to the person skilled in the art.

The collecting claw 5, represented in a simplified manner in FIG. 1, includes a bowl. This bowl has an upper portion 50 and a lower portion 51 which can be assembled together.

The upper portion 50 of the bowl has intakes 500 on which the connectors coming from the liners are coupled.

The connectors are coupled to the rims 220 of the liners 2.

The milk extracted from a teat is thus routed from the teat accommodation space of a liner to the bowl of the collecting claw, running through the milk evacuation opening 22 of the liner, and then into the connector connecting the liner to the collecting claw.

The lower portion 51 of the bowl has an outlet 510 on which an evacuation tube 7 is connected.

The collecting claw 5, at least because of the presence of the bowl, has a milk circulation space 52.

The milking system also includes a device for dipping the teat with a dipping product. This dipping product is an at least hydrating solution intended for being sprayed on the teats after milking.

This dipping device includes:
 a source 8 of dipping product;
 an injection interface 6 which is mounted on the collecting claw 5;
 an injection tube 3 for each of the four liners 2.

The interface 6 can be mounted on the collecting claw 5 while being coupled on this collecting claw 5 in a non-destructive manner. The interface 6 can thus be removed from the collecting claw 5 a posteriori without this making this collecting claw 5 unusable without the interface 6.

According to another embodiment that can be considered, the interface 6 can be designed and mounted so that it is inseparable from the collecting claw 5.

According to another variant, it is possible to consider using a dipping device including one interface per liner, mounted between each liner and the connector connecting the liner to the collecting claw.

Figure 2:
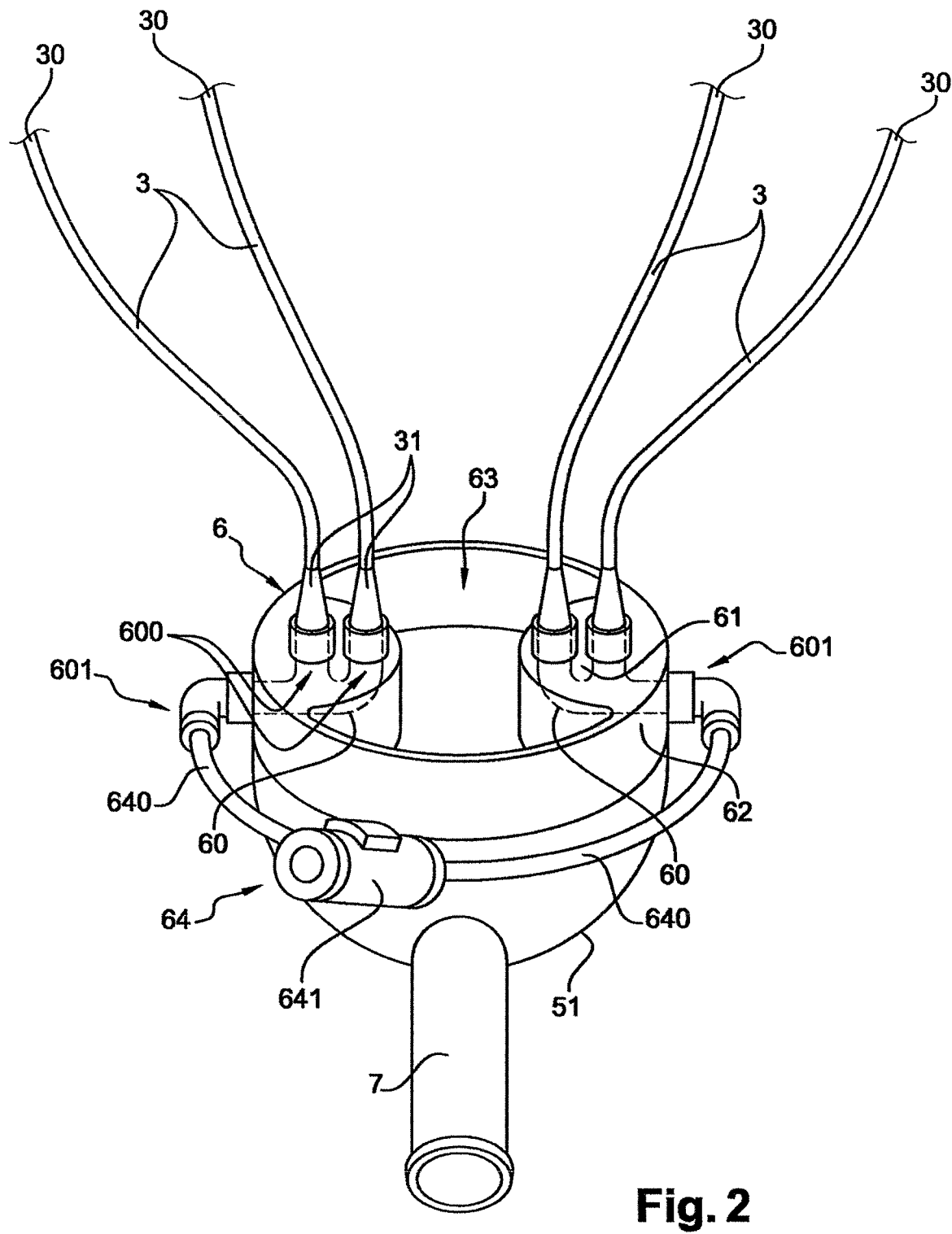
FIG. 2 is a diagrammatic representation in perspective of just the dipping device of the milking system presented in reference to FIG. 1, of which the interface is mounted on the lower portion of the bowl of a collecting claw.

According to the embodiment of the invention illustrated in FIGS. 1 and 2, the interface is designed to be inserted between the upper portion 50 and the lower portion 51 of the bowl of the collecting claw.

The interface in particular assumes the form of a ring 61.

The interface thus includes means for assembling on the collecting claw.

These assembling means can be complementary to the connecting elements enabling one to assemble the upper portion and the lower portion of the bowl. For example, if the lower portion of the bowl is initially screwed on the upper portion of the bowl, then the interface has assembling means enabling one to screw the interface on the upper portion of the bowl, and then to screw the lower portion of the bowl on the interface.

The interface 6 is designed to enable one to bring the dipping product from the outside of the collecting claw 5 to the milk circulation space 52, inside of the collecting claw 5.

For this purpose, the injection interface 6 includes at least one pipe 60 with:
 inlets 601 located on an external surface 62 of the interface 6, these outlets 601 being coupled to the source 8 of dipping product.
 outlets 600 located inside of the milk circulation space 52.

As can be seen in FIG. 2, the interface 6 is designed for equipping a milking system having four liners, and it has two internal pipes 60 (represented by dotted lines), each pipe having an inlet 601 and two outlets 600.

The inlets 601 are connected to the source of dipping product by means of an adaptor 64 having an end piece 641 from which two arms 640 extend, each of which is coupled to one of the inlets 601.

Each of the four outlets 600 is coupled to a different injection tube 3.

In reference to FIGS. 1 and 2, the injection tubes 3 extend from each outlet 600 of the pipe 60 substantially to the accommodation space 20 for the teat, running inside of the connector 4 and through the evacuation opening 22.

These injection tubes 3 are flexible and can have characteristics similar to those of catheters.

The interface 6 has a central opening 63 which opens on both sides of the interface 6. This central opening 63 communicates with the milk circulation space 52.

Each injection tube has a first end 30 which leads into the accommodation space 20 of a liner, and a second end 31 coupled to one of the outlets 600 of the interface 6.

The first ends 30 of the injection tubes 3 lead into the accommodation spaces 20 of the liners while being surrounded by the massaging components 23.

More precisely, for each liner, a cylindrical portion of the massaging component 23 surrounds the first end 30 of the injection tube 3.

In reference to FIG. 1, the injection tube 3 is designed in such a manner that the first end 30 opens substantially in the vicinity of the accommodation space 20. Indeed, the injection tube 3 opens at a depth of a few millimeters, for example 2 to 5 millimeters, greater than the maximum depth P of insertion of a teat 1 in the liner, in this particular embodiment of the invention.

More precisely, in each liner, the first end 30 of the injection tube dedicated to the liner is intended for being located facing the meatus of the teat 1, while being as close as possible to this meatus but without coming in contact with it.

In other words, the injection tube has a length such that its first end 30 is located inside of the liner, in a position in which it is substantially in contact with the accommodation space for the teat 1, while being surrounded by a cylindrical portion of the massaging component 23. Under the action of the massaging component, the first end of the injection tube is centered inside of the liner, and directly facing the teat.

In variants of this particular embodiment of the invention, the first end of the injection tube 3 can be at a distance of 5 to 10 millimeters, or 10 to 50 millimeters, or even 80 millimeters, from the accommodation space of the liner. It should be noted that in the case of a greater distance between the first end of the injection tube and the accommodation space of the liner, the injection pressure of the dipping product should be adjusted, in such a manner that the dipping product can be applied appropriately to the liner.

The milking system also includes:
  means for synchronization of the dipping device with the massaging component;
  a compressed air injection device 90 communicating with the dipping device;
  a disinfectant source 91 connected to the interface 6.

Thanks to the synchronization means, the dipping product, injected in liquid form, is transformed into an emulsion thanks to the synchronized action of the massaging component whose pulsations emulsify the liquid.

The compressed air injection device is used for drying the different pipelines of the system in which fluids have circulated during the milking and after the milking. The compressed air used by the device is filtered.

The disinfectant is advantageously injected through the interface and the injection tubes in order to rid these elements of the traces of dipping product while performing a disinfection of the liners.

This disinfectant is brought to the interface from the source of disinfectant by means of a disinfectant supply circuit. In this particular embodiment of the invention, the disinfectant supply circuit is the same as the dipping product injection circuit which connects the source of dipping product to the interface. In this manner, a disinfection of the dipping product injection circuit is performed concomitantly with the disinfection of the interface, the injection tubes and the liners.

The disinfection is performed only after the withdrawal of the liners from the teats of the dairy animal.

The milking system also includes a rinsing device (not represented) coupled to the collecting claw. This rinsing device makes it possible to clean possible traces of dipping product and disinfectant off of the collecting claw, the connectors and the liners.

The different fluids used in the mechanical milking system according to the invention are injected by means of electrovalves 92, 93, 94 the activation of which makes it possible to deliver precise doses of fluids.

The milking system according to the invention comprises a programmable element making it possible to trigger the electrovalves in order to perform timed sequences, which can be modulated in terms of number and duration, for injection of dipping product, injection of disinfectant, rinsing with clean water, and drying with compressed air.

The milking system can be used in three phases.

In a first phase, the dipping product is injected by means of the dipping device in order to protect the teats after milking. This dipping step is automatically performed after milking when the liners are still in place on the teats of the animal.

After this phase, the liners are withdrawn from the teats of the animal.

In a second phase, in order to avoid cross contamination between two animals, the equipment is disinfected. Thanks to the use of the interface and the injection tubes, the disinfectant is injected flawlessly (optimized dose of disinfectant, reliable injection into the different liners of the milking system, etc.)

In a third phase, after the dipping step and after the disinfection step which are performed using non-food-quality products, the milking system allows automation of the rinsing and drying of the equipment.

What is claimed is:

1. A mechanical milking system comprises:
   at least one liner defining an accommodation space for a teat and having a milk evacuation opening;
   a collecting claw;
   for each liner, a connector connecting the liner to the collecting claw;
   a device for dipping the teat with a dipping product, the dipping device including a source of the dipping product;
   wherein the dipping device comprises:
     an injection interface mounted on the collecting claw, the interface including at least one pipe with:
       at least one inlet located on an external surface of the interface and intended for being coupled to the source of dipping product;
       at least one outlet located inside of a milk circulation space;
     an injection tube for each liner, the injection tube extending from said at least one outlet of the pipe and substantially to the teat accommodation space, running inside of the connector and through the evacuation opening.

2. The mechanical milking system of claim 1, wherein the collecting claw comprises a bowl having an upper portion and a lower portion that can be assembled together, and in that the interface is inserted between the upper portion and the lower portion of the bowl.

3. The mechanical milking system of claim 1, wherein the interface assumes the form of a ring and has a central opening on both sides of the interface, the central opening communicating with the milk circulation space.

4. The mechanical milking system of claim 1, wherein the injection tube is flexible.

5. The mechanical milking system of claim 4, wherein said at least one liner includes a massaging component for the teat, and in that the injection tube has a first end opening into the accommodation space while being surrounded by a cylindrical portion of the massaging component, the injection tube being designed to open into the accommodation space substantially at the level of the maximum depth (P) of insertion of the teat in the accommodation space.

6. The mechanical milking system of claim 5, further comprising means for synchronizing the dipping device with the massaging component.

7. The mechanical milking system of claim 1, further comprising a compressed air injection device communicating with the dipping device.

8. The mechanical milking system of claim 1, wherein the dipping device is connected to a source of disinfectant.

9. The mechanical milking system of claim 1, further comprising a rinsing device coupled to the collecting claw.

10. A device for dipping a teat with a dipping product, for a mechanical milking system, the device comprising:
- at least one liner defining an accommodation space for a teat and having a milk evacuation opening;
- a collecting claw;
- for each liner, a connector connecting the liner to the collecting claw;
- an injection interface comprising:
  - means for assembling on the collecting claw;
  - at least one pipe with:
    - at least one inlet located on an external surface of the interface and intended for being coupled to a source of dipping product;
    - at least one outlet located inside of a milk circulation space;
- an injection tube for each liner, the injection tube extending from said at least one outlet of the pipe and having a length arranged so that said injection tube extends substantially to the accommodation space of the liner, running inside of the connector and through the milk evacuation opening of the liner when said injection tube is partially housed in a connector and a liner.

\* \* \* \* \*